(12) United States Patent
Nola

(10) Patent No.: US 10,415,619 B1
(45) Date of Patent: Sep. 17, 2019

(54) TOOLLESS FASTENER FOR ENGINE COVER

(71) Applicant: FORD GLOBAL TECHNOLOGIES, LLC, Dearborn, MI (US)

(72) Inventor: Gary P. Nola, Saline, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/911,388

(22) Filed: Mar. 5, 2018

(51) Int. Cl.
F16B 13/00 (2006.01)
F16B 13/08 (2006.01)
F02B 77/13 (2006.01)

(52) U.S. Cl.
CPC .......... F16B 13/0825 (2013.01); F02B 77/13 (2013.01)

(58) Field of Classification Search
CPC . B60R 2011/0038; F16B 21/02; F16B 37/042
See application file for complete search history.

(56) References Cited

U.S. PATENT DOCUMENTS

| 4,020,970 | A | * | 5/1977 | Koscik .................. F01M 11/04 220/293 |
| 4,143,895 | A | | 3/1979 | Kirchweger et al. |
| 6,427,674 | B1 | * | 8/2002 | Wylin ..................... H01T 13/44 123/634 |
| 6,474,290 | B1 | | 11/2002 | Coffey et al. |
| 7,289,760 | B2 | | 10/2007 | Kotani |
| 7,631,630 | B2 | | 12/2009 | Sedlar et al. |
| 9,464,607 | B2 | | 10/2016 | Kulkarni et al. |
| 9,540,997 | B2 | | 1/2017 | Lohr et al. |
| 9,551,307 | B1 | | 1/2017 | Hamzeh et al. |
| 9,840,989 | B2 | | 12/2017 | Newman et al. |
| 2006/0182629 | A1 | * | 8/2006 | Kozerski ............... F01D 25/162 415/214.1 |
| 2007/0172332 | A1 | * | 7/2007 | Thompson ............ F16B 13/066 411/378 |
| 2008/0181681 | A1 | * | 7/2008 | Yang ..................... G03G 21/168 399/302 |
| 2009/0241353 | A1 | * | 10/2009 | Ericson ................... B27B 17/14 30/386 |

(Continued)

FOREIGN PATENT DOCUMENTS

| EP | 2008883 A1 | 12/2008 |
| KR | 20070052123 A | 5/2007 |

*Primary Examiner* — Long T Tran
(74) *Attorney, Agent, or Firm* — Julia Voutyras; MacMillan, Sobanski & Todd, LLC

(57) ABSTRACT

A decorative engine cover is mounted to an engine using fasteners not requiring the use of any tools. A cam cover has a tubular socket with an inner surface defining a cavity including a fixed wedge and a longitudinal bumper projecting into the cavity. A removable engine cover defines an recess receiving the tubular socket and an aperture aligned with the cavity. A handle block comprises a main body with a lower end rotatable and axially slidable in the cavity, an upper flange, and a retractable wedge projecting radially from the main body. A biaser engages the engine cover and handle block urging the block away from the cam cover. The wedges are engageable when the main body is rotationally within a locking region and axially slid toward the cam cover. The fixed wedge and retractable wedge disengage when the main body is rotated out of the locking region.

18 Claims, 6 Drawing Sheets

(56) References Cited

U.S. PATENT DOCUMENTS

2012/0168246 A1* 7/2012 Kondo .................... F02B 77/13
  181/284
2015/0013636 A1* 1/2015 Boese ................... F01L 1/3442
  123/198 E
2015/0075482 A1 3/2015 Kondo et al.

* cited by examiner

TOOLLESS FASTENER FOR ENGINE COVER

BACKGROUND OF THE INVENTION

The present invention relates in general to covers for internal combustion engines in motor vehicles, and, more specifically, to manually mounting of a soft engine cover to an engine component using a robust fastener without requiring tools.

The engine compartment of a vehicle presents various challenges for vehicle engineers and designers in providing functionality, serviceability, and aesthetics in a relatively small space. Consideration must also be given to manufacturing and assembly costs in addition to weight, which ultimately impacts fuel economy, to deliver a competitive product. An engine cover is typically used in order to enhance the overall appearance of the engine compartment and to reduce the propagation of engine noise.

The typical mounting for an engine cover to an engine upper component (e.g., a cam cover or an air intake manifold) may be comprised of several steel brackets, fasteners, or other joining structures such as hooks or clamps. The use of several intermediate components which attach on one side to the engine cover and on the other side to the engine component creates many potential sites for NVH (noise, vibration, and harshness) problems such as squeak and rattle. A relatively large part count leads to added part costs and an associated increase in manufacturing/assembly costs.

Conventional fasteners used to secure the cover have been relatively difficult to reach and/or manipulate during installation, and have generally required tools such as a wrench or other driver to secure the fasteners. When tools are required, the design of the engine and other components in the engine compartment must maintain sufficient open space around the fasteners to allow clearance for placement and manipulation of the tool. Thus, it would be desirable to increase noise attenuation and improve visual appearance while providing an attachment that simplifies installation, reduces parts count, relaxes constraints on space utilization, and lowers overall cost. Additional desirable features include easy verification of proper installation of the fasteners, low installation force, high retention force, and reliable retention when subjected to vibrations.

SUMMARY OF THE INVENTION

In one aspect of the invention, an engine cover system comprises a cam cover with a tubular socket having an inner surface defining a cavity with a fixed wedge and a longitudinal bumper projecting into the cavity. A removable engine cover defines an recess which receives the tubular socket and defines an aperture aligned with the cavity. A handle block comprises a main body with a lower end rotatable and axially slidable in the cavity, an upper flange, and a retractable wedge projecting radially from the main body. A biaser engages the engine cover and handle block urging the handle block away from the cam cover. The fixed wedge and retractable wedge are engageable when the main body is rotationally within a locking region and axially slid toward the cam cover. The fixed wedge and retractable wedge disengage when the main body is rotated out of the locking region.

DETAILED DESCRIPTION OF PREFERRED EMBODIMENTS

Figure 1:
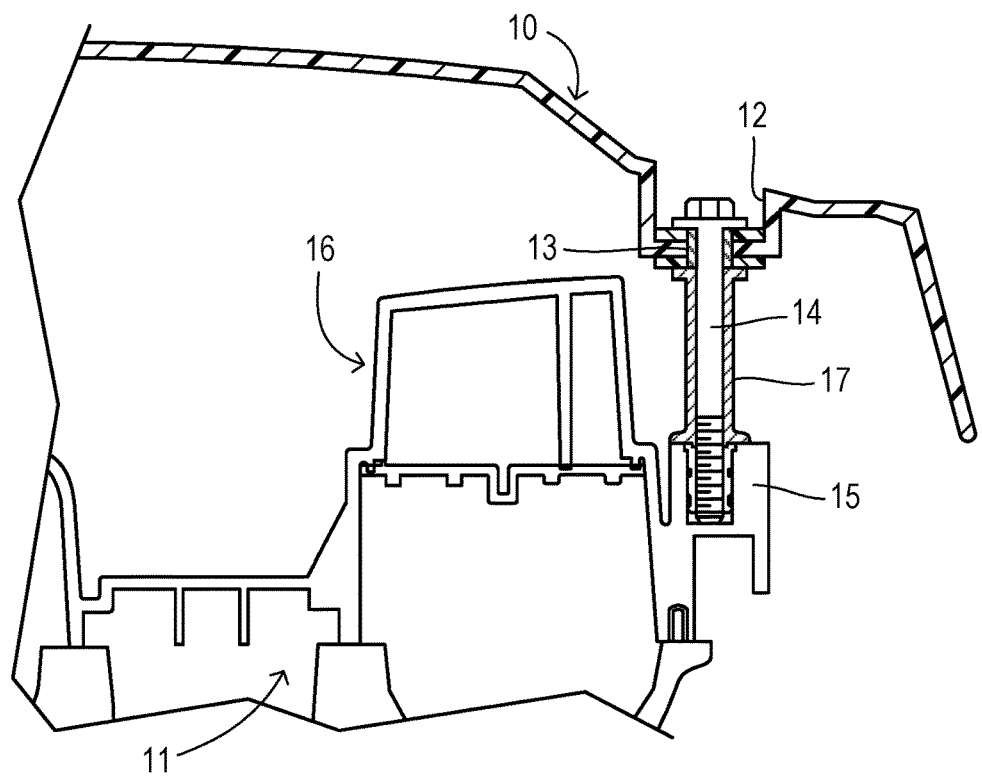
FIG. 1 is a cross section showing a conventional engine cover mounted using a bolt.

A prior art engine cover system is shown in FIG. 1. An engine cover 10 is fitted over an engine 11. Engine cover 10 includes a recessed area 12 with a fastener-retaining aperture 13. A threaded fastener (e.g., bolt) 14 is fitted through aperture 13 to a fastener hole formed in a boss 15 of a cam cover component 16. Since a substantial gap exists between cam cover boss 15 and cover 10, a spacer 17 may be utilized. Other mounting connections between engine cover 10 and upper components of the engine (e.g., the cam cover and/or an air intake manifold) may use similar fastening bolts and spacers, for example. Since threaded fastener 14 requires a tool for installation and removal, corresponding costs and other disadvantages are imposed during manufacture, assembly, and servicing. Examples of mounting systems for decorative, soft engine covers are shown in U.S. Pat. No. 9,464,607, U.S. Pat. No. 9,551,307, and U.S. Pat. No. 9,840,989, which are incorporated herein by reference in their entirety.

Figure 3:
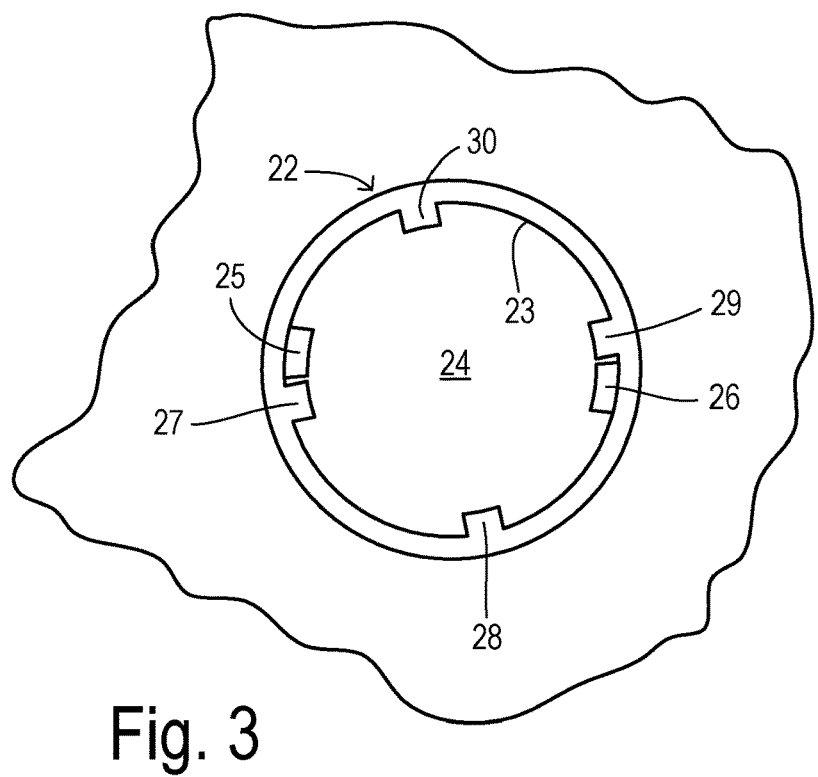
FIG. 3 is a top view of the mounting socket on the engine component of FIG. 2.
Figure 2:
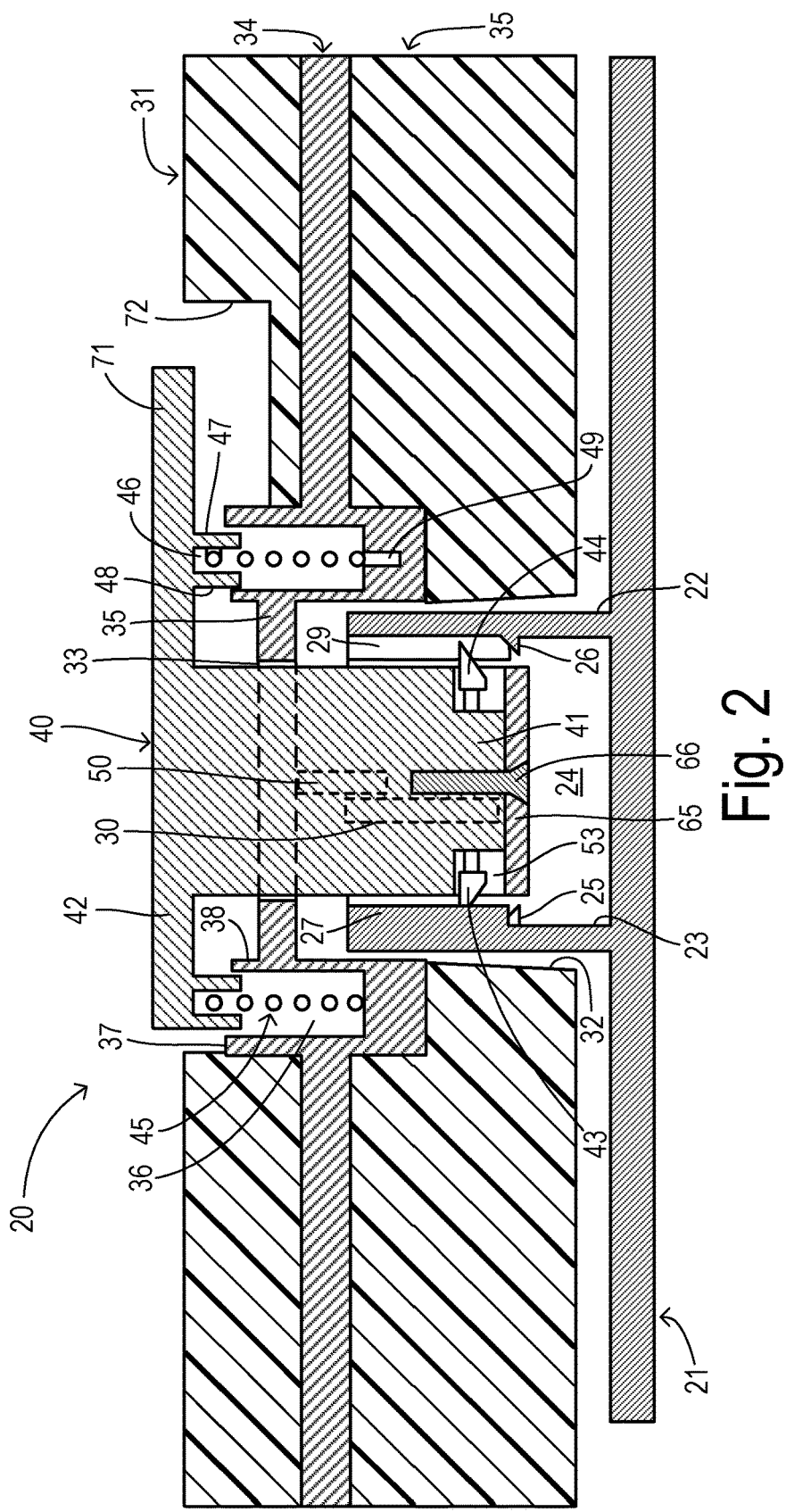
FIG. 2 is a cross section of an engine cover, engine component, and fastener according to one preferred embodiment of the invention in an unlatched state.

An engine cover system 20 according to one preferred embodiment of the invention is shown in FIGS. 2 and 3. An engine component 21 (such as a cam cover or an intake manifold) has a tubular mounting socket 22. Socket 22 is generally cylindrical and has an inner surface defining an internal cavity 24. Fixed wedges 25 and 26 and four longitudinal bumpers 27, 28, 29, and 30 project from the inner surface into cavity 24. A removable, composite engine cover 31 defines a recess 32 which receives the tubular socket 22. Cover 31 further defines an aperture 33 aligned with cavity 24. In a preferred embodiment, cover 31 includes a relatively rigid lattice 34 that is overmolded by a relatively soft foam body 35. Lattice 34 is preferably molded from nylon or other rigid thermoplastic material, but could also be formed of metal. Foam body 35 is preferably formed of a polyurethane foam, wherein foaming provides flexibility and improved damping characteristics for attenuating noise and vibration. Foam body 35 has an appropriate size and shape to cover and rest upon the engine assembly, and may be molded with decorative features, logos, or other graphical or textual information.

Figure 7:
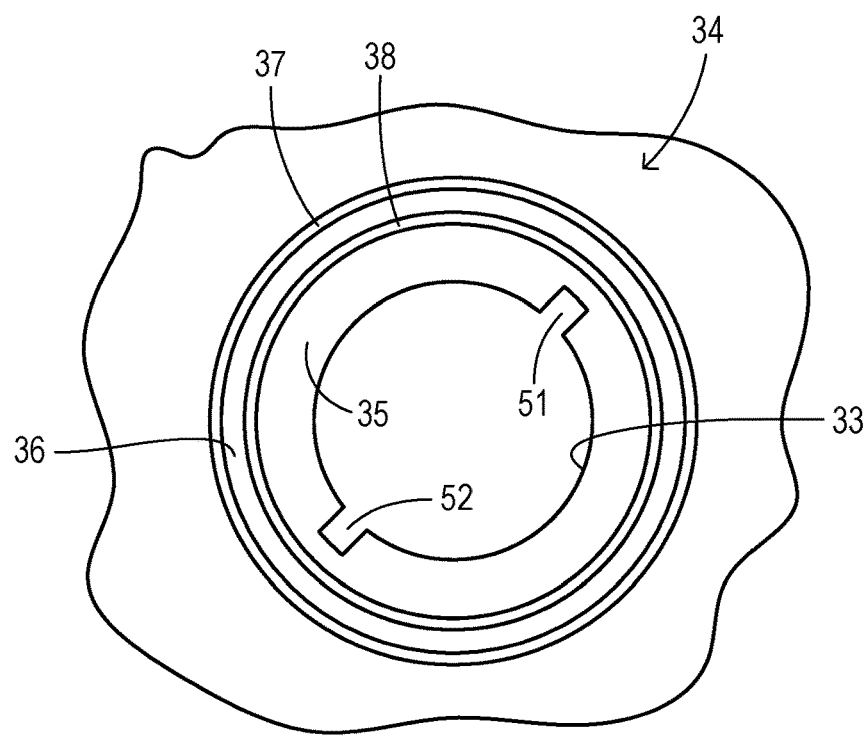
FIG. 7 is a top view of an overmolded engine cover including a lattice for defining the aperture for receiving the handle block.

FIG. 7 shows a portion of lattice 34 in greater detail, wherein aperture 33 is formed within a plate section 35 which is not covered by foam body 35. Also not covered by foam body 35 is a groove 36 between cylindrical walls 37 and 38 for retaining a spring biaser described below.

Returning to FIG. 2, a handle block 40 comprises a main body 41 with a lower end rotatable and axially slidable in cavity 24, an upper flange 42, and retractable wedges 43 and 44 projecting radially from main body 41 to interact with fixed wedges 25 and 26. A bottom side of flange 42 has a groove 46 between cylindrical walls 47 and 48. A biaser 45 (shown as a coil spring) has one end secured in groove 46 and the other end secured in groove 36 of lattice 34. For example, the lower end of spring biaser 45 can be press fit into an anchoring hole 49 in groove 36. Grooves 36 and 46 are concentric, and walls 47 and 48 define a radial span that preferably fits within groove 36 to facilitate up and down axial movement of handle block 40. Biaser 45 engages engine cover 31 and handle block 40 in order to urge handle block 40 away from engine component 21 and toward an upward position where it achieves an unlatched (unfastened) state wherein fixed wedges 25 and 26 and retractable wedges 43 and 44 are disengaged.

Figure 8:
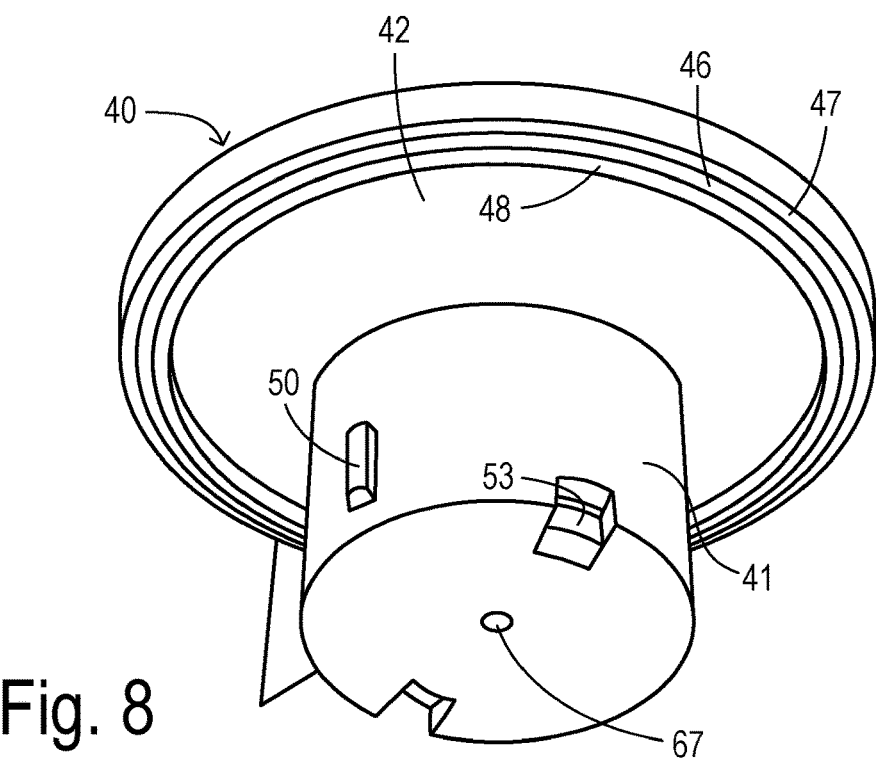
FIG. 8 is a bottom, perspective view of a portion of the toolless fastener according to a preferred embodiment.

In order to retain handle block 40 within aperture 33 in cover 31, main body 41 has a pair of diametrically opposite stop blocks 50 projecting radially outward (one of which is seen in FIG. 8). When handle block 40 is at its upward position as shown in FIG. 2, stop blocks 50 abut plate 35 which blocks further upward movement of handle block 40. In order to install handle block 40 into aperture 33 in lattice 34, a pair of notches 51 and 52 are provided as shown in FIG. 7, at an angular position outside of the normal range of rotation for handle block 40 once it is installed.

Figure 9:
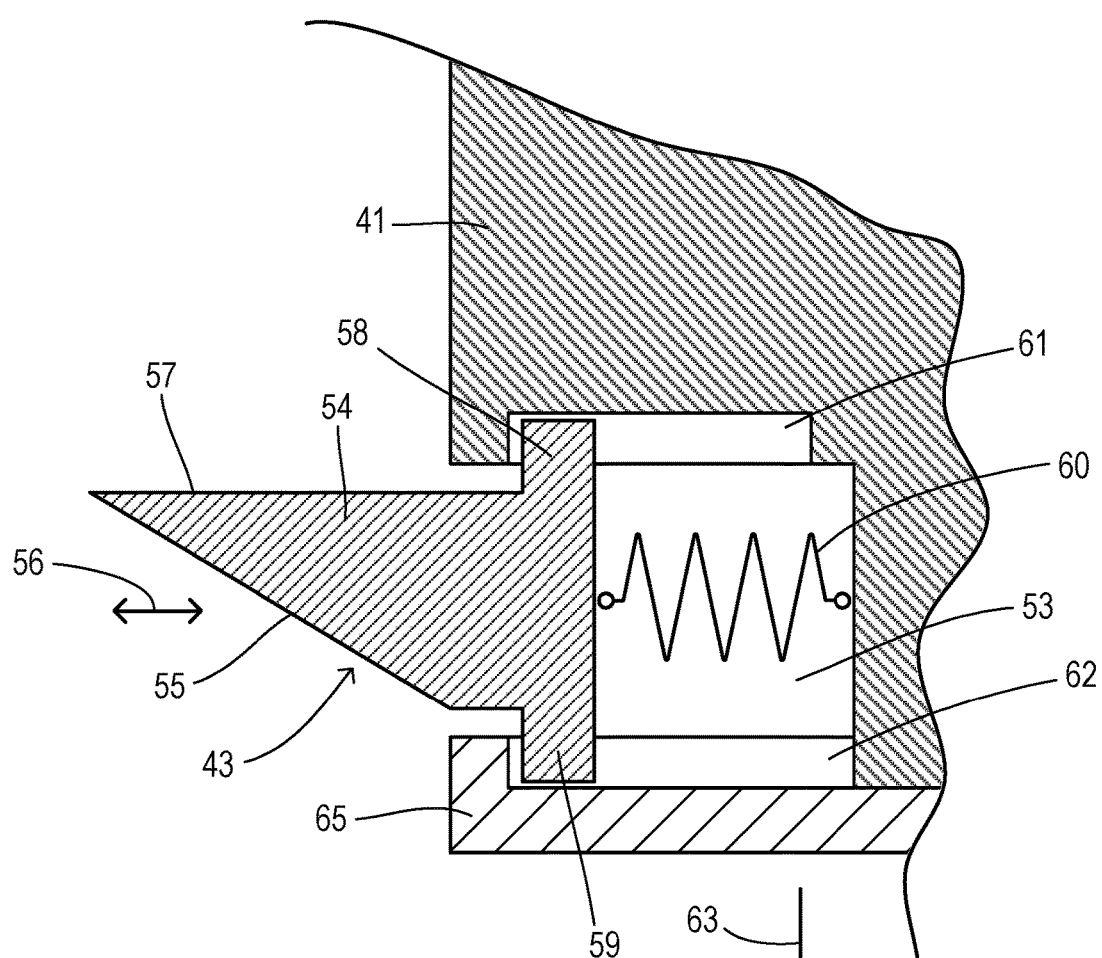
FIG. 9 is a side view showing an embodiment of the retractable wedge in greater detail.

Retractable wedges 43 and 44 are biased toward a radially outward position and they are radially retractable. Retractable wedge 43 can be spring mounted using many different mechanisms that will be readily apparent to those skilled in the art. One such mechanism is shown in greater detail in FIG. 9. Wedge 43 is installed in a recess 53 formed in main body 41 of handle block 40. An end plate 65 attached to a bottom end of main body 41 via a screw 66 inserted into a screw hole 67 in order to enclose one side of recess 53.

A slider block 54 has a flat deflection surface 55 which is slanted with respect to a radial retraction axis 56. A flat latch surface 57 lies in a radial plane that is perpendicular to the rotation axis of handle block 40. Block 54 has fingers 58 and 59 extending from its base and captured in grooves 61 and 62 in main body 41 and end plate 65, respectively. A spring 60 is arranged in recess 53 between block 54 and main body 41 for being compressed during retraction and for urging block 54 back to its extended position. When main body 41 is pushed longitudinally into socket 22 in the direction of arrow 63 (i.e., downward in FIG. 2), and with handle block 40 rotationally within a locking region (wherein retractable wedges 43 and 44 are longitudinally aligned with fixed wedges 25 and 26, respectively), then deflection surface 55 encounters a complementary slanted surface on fixed wedge 25. The deflection surfaces slide over each other so that slider block 54 radially retracts. After clearing the deflection surfaces, slider block 54 extends radially outward to the position shown in FIG. 4, which represents the latched state. Latch surface 57 engages a corresponding bottom surface of fixed wedge 25. In the latched state, bias spring 45 is compressed. The resulting force between fixed wedges 25 and 26 and retractable wedges 43 and 44 retains cover 31 onto engine component 21.

In order to control rotation of handle block 40 within tubular socket 22, longitudinal bumpers 27 and 29 are placed adjacent to fixed wedges 25 and 26, respectively, to define an edge of the locking region. Thus, when handle block 40 is squarely within the locking region then retractable wedges 43 and 44 fully coincide with fixed wedges 25 and 26. Bumpers 28 and 30 are angularly spaced from bumpers 27 and 29 to provide rotation limits for stop blocks 50 at the same rotational position.

Figure 4:
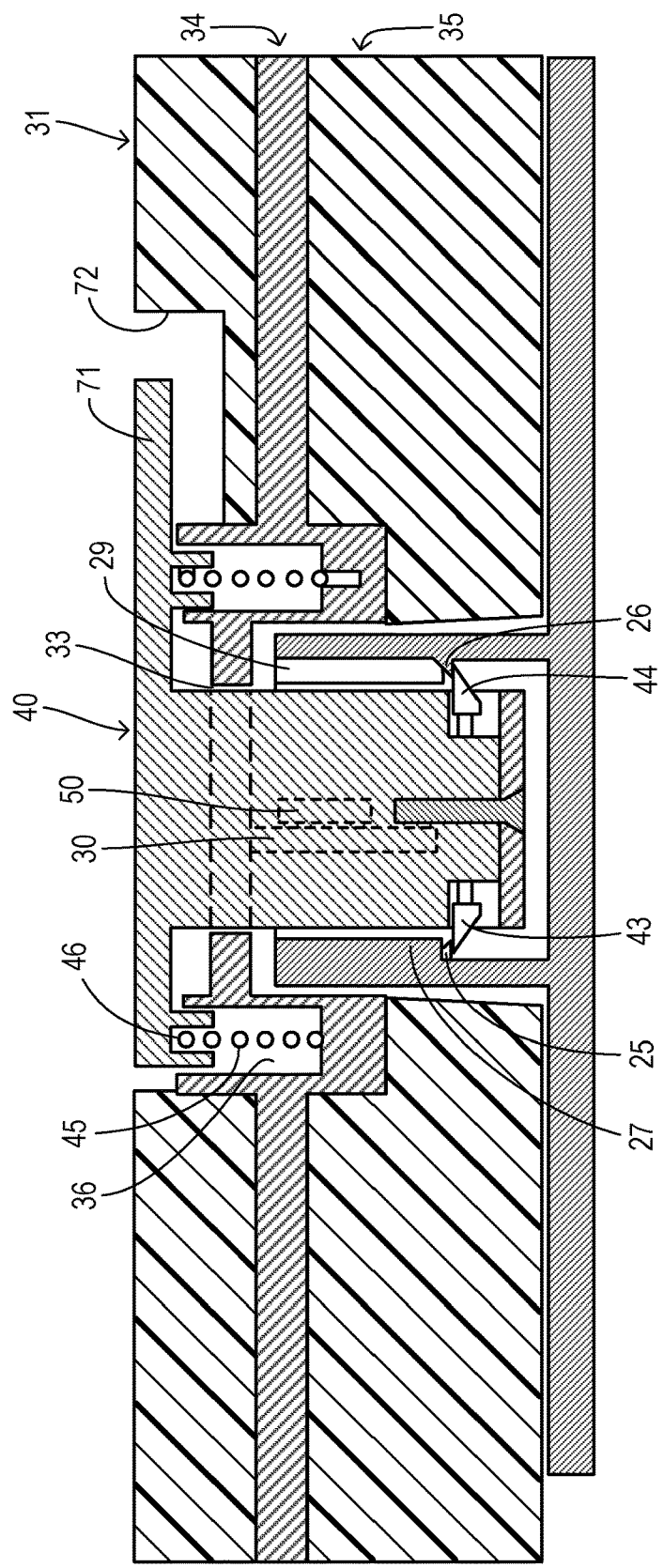
FIG. 4 is a cross section of an engine cover, engine component, and fastener according to the embodiment of FIG. 2 in a latched state.
Figure 5:
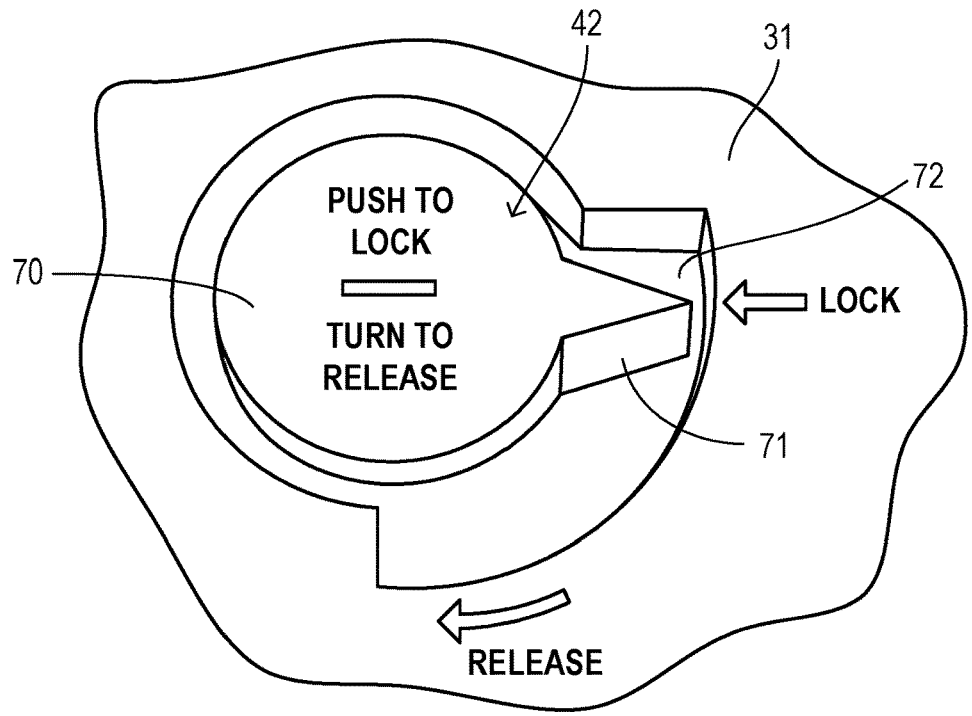
FIG. 5 is a top, perspective view of a handle block and a recessed engine cover according to a preferred embodiment of the invention.

From the latched state shown in FIG. 4, the fastener can be released by rotating handle block 40 in the direction away from the rotational limits. To facilitate handling during rotation, upper flange 42 preferably has an elongate profile such as a circular disc portion 70 and a radially-extending tab section 71 as shown in FIG. 5. Engine cover 31 has an upper recess 72 defining an outer periphery likewise configured to restrict the rotational positions where flange 42 is insertable to the latched state. Recess 72 is shaped to receive tab section 71 as it rotates from the locking region (i.e., aligned with the "LOCK" marker labeled on cover 31) in a clockwise direction toward the "RELEASE" marker labeled on cover 31. As handle block 40 rotates from the locking region to an adjacent region of rotation, the latch surfaces on the fixed and retractable wedges slide against one another until they disengage. Once disengaged, spring force from the biaser causes the handle block to "pop up" into the unlatched state, from where it can be rotated counterclockwise back to the locking alignment ready for the wedges to re-engage.

Figure 6:
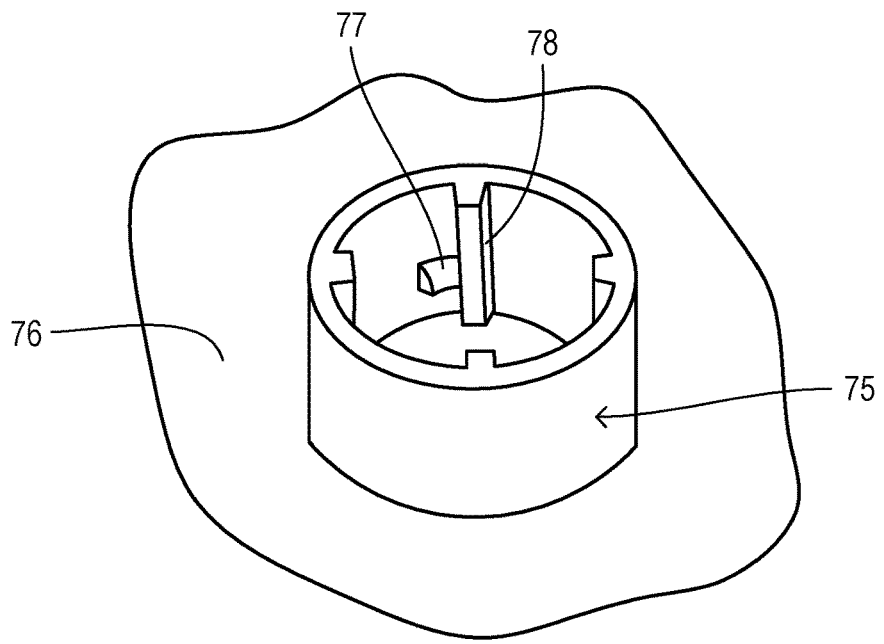
FIG. 6 is a perspective view of another embodiment of a mounting socket.

FIG. 6 shows an alternative embodiment for a tubular socket 75 on an engine component 76 (e.g., a cam cover or an intake manifold). A fixed wedge 77 and a longitudinal bumper 78 are arranged side by side. In this embodiment, bumper 78 extends longitudinally below wedge 77, thereby limiting rotation of the handle block over all longitudinal positions of the handle block.

The foregoing invention has provided an advantageous system for toolless mounting of a decorative/sound absorbing engine cover. The button-type fastener is pressed down against a spring and latches in a Down position. The button is rotated to release the button back to its Up position. A visually attractive system can be obtained because the 'button' can be styled to have interesting geometry. It replaces standard bolt/nut fasteners that cannot be styled and that often necessitate other compromises in engine layout in order to maintain tool clearance. The invention achieves positive retention of the engine cover (e.g., vibrations do not affect the mechanisms fastening capability). The button can be released only by hand turning it to unlatch the cover. The fastener is easy to install. A sufficiently strong spring biaser can be sized for positive retention while requiring less than 10 pounds of force when setting the cover in place and depressing the button to secure the cover. The force to depress the button is regulated by the spring stiffness. Depending on layout and number of fasteners, this could be as little as 1 or 2 pounds of force. The invention is easily adapted for providing confirmation of proper installation at the vehicle assembly plant. For example, cameras can be used to verify the positions of the buttons. The buttons can have bright colors that are only exposed when not engaged.

What is claimed is:

1. An engine cover system comprising:
    an engine component with a tubular socket projecting from the engine component, the tubular socket having an inner surface defining a cavity with a fixed wedge and a longitudinal bumper projecting into the cavity;
    a removable engine cover defining an recess which receives the tubular socket and defining an aperture aligned with the cavity;
    a handle block received in the aperture of the engine cover and comprising a main body with a lower end rotatable and axially slidable in the cavity, an upper flange, and a retractable wedge projecting radially from the main body, wherein the retractable wedge retracts radially and is biased toward a radially outward position; and a biaser engaging the engine cover and handle block urging the handle block away from the engine component;

wherein the fixed wedge and retractable wedge are engageable when the main body is rotationally within a locking region and axially slid toward the engine component, and wherein the fixed wedge and retractable wedge disengage when the main body is rotated out of the locking region.

2. The system of claim 1 wherein the fixed wedge and the retractable wedge define respective deflection surfaces which engage by axially advancing the lower end within the cavity so that the retractable wedge radially retracts, and wherein the fixed wedge and the retractable wedge define respective latch surfaces which engage when the retractable wedge radially extends after clearing the deflection surfaces.

3. The system of claim 1 wherein the engine cover is comprised of a foam body over a molded lattice defining the aperture.

4. The system of claim 1 wherein the biaser is comprised of a coil spring retained between the flange and the engine cover.

5. The system of claim 4 wherein the coil spring is retained in concentric grooves formed on the flange and the engine cover.

6. The system of claim 1 wherein the longitudinal bumper defines an edge of the locking region.

7. The system of claim 1 wherein the cavity and lower end of the main body are cylindrical, wherein the engine cover is comprised of a foam body over a molded lattice defining the aperture, wherein the lattice includes a plate defining the aperture, and wherein the main body includes a stop feature engaging the plate to capture the handle block on the engine cover.

8. The system of claim 1 wherein the flange has an elongated profile, and wherein the engine cover defines an upper recess receiving the flange.

9. The system of claim 8 wherein the upper recess defines an outer periphery configured to limit rotation of the flange from the locking region to an adjacent region of rotation that disengages the retractable wedge from the fixed wedge.

10. Apparatus comprising:
an engine component with an outwardly projecting tubular socket with a cylindrical shape around a longitudinal axis, the tubular socket having an inner surface with a fixed wedge projecting radially inward;
an engine cover defining an aperture configured to align with the longitudinal axis;
a handle block received in the aperture of the engine cover and comprising a main body with a lower end rotatable and axially slidable in the tubular socket, an upper flange, and a retractable wedge, wherein the retractable wedge projects radially from the lower end and is biased toward a radially outward position; and
a biaser urging the flange away from the tubular socket;
wherein the wedges latch together using longitudinal insertion with the wedges axially aligned and are released by rotation around the longitudinal axis so that the wedges are no longer axially aligned.

11. The apparatus of claim 10 wherein the fixed wedge and retractable wedge are engageable when the main body is rotationally within a locking region and axially slid into the tubular socket, and wherein the fixed wedge and retractable wedge disengage when the main body is rotated out of the locking region.

12. The apparatus of claim 11 wherein the flange has an elongated profile, and wherein the engine cover defines an upper recess receiving the flange.

13. The apparatus of claim 12 wherein the upper recess defines an outer periphery configured to limit rotation of the flange from the locking region to an adjacent region of rotation that disengages the retractable wedge from the fixed wedge.

14. The apparatus of claim 10 wherein the fixed wedge and the retractable wedge define respective deflection surfaces which engage by axially advancing the lower end within the socket so that the retractable wedge radially retracts, and wherein the fixed wedge and the retractable wedge define respective latch surfaces which engage when the retractable wedge radially extends after clearing the deflection surfaces.

15. The apparatus of claim 10 wherein the engine cover is comprised of a foam body over a molded lattice defining the aperture.

16. The apparatus of claim 10 wherein the biaser is comprised of a coil spring retained between the flange and the engine cover.

17. The apparatus of claim 16 wherein the engine cover is comprised of a foam body over a molded lattice defining the aperture, and wherein the coil spring is retained in concentric grooves formed on the flange and the lattice.

18. The apparatus of claim 10 wherein the socket and lower end of the main body are cylindrical, wherein the engine cover is comprised of a foam body over a molded lattice defining the aperture, wherein the lattice includes a plate defining the aperture, and wherein the main body includes a stop feature engaging the plate to capture the handle block on the engine cover.

* * * * *